US010289769B2

United States Patent
Yun

(10) Patent No.: US 10,289,769 B2
(45) Date of Patent: May 14, 2019

(54) METHOD FOR IDENTIFYING STOCHASTIC INFORMATION OF HETEROGENEOUS MATERIALS

(71) Applicant: GunJin Yun, Copley, OH (US)

(72) Inventor: GunJin Yun, Copley, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 841 days.

(21) Appl. No.: 14/466,776

(22) Filed: Aug. 22, 2014

(65) Prior Publication Data

US 2015/0057988 A1 Feb. 26, 2015

Related U.S. Application Data

(60) Provisional application No. 61/869,907, filed on Aug. 26, 2013.

(51) Int. Cl.
*G06F 17/50* (2006.01)
(52) U.S. Cl.
CPC ...... *G06F 17/5018* (2013.01); *G06F 2217/10* (2013.01)
(58) Field of Classification Search
None
See application file for complete search history.

(56) References Cited

U.S. PATENT DOCUMENTS

| 2004/0138862 A1* | 7/2004 | Hu | G01V 1/28 |
| | | | 703/2 |
| 2005/0172699 A1* | 8/2005 | Hu | E21B 49/00 |
| | | | 73/38 |
| 2010/0049451 A1* | 2/2010 | Lu | G01N 3/12 |
| | | | 702/42 |

OTHER PUBLICATIONS

George Stefanou "The stochastic finite element method: Past, present and future", Comput. Methods Appl. Mech. Engrg. 198. 2009 pp. 1031-1051.*

(Continued)

*Primary Examiner* — Brian W Wathen
*Assistant Examiner* — Abdou Seye
(74) *Attorney, Agent, or Firm* — Renner Kenner Greive Bobak Taylor and Weber

(57) ABSTRACT

A method for identifying stochastic information of a heterogeneous material utilizes physical loading measurements that are input into a global optimization process. The optimization process executes, in parallel, a force-driven nonlinear finite element simulation and a displacement-driven finite element simulation of a constitutive model of the heterogeneous material. The constitutive models model the spatially varying random material properties (i.e. stochastic properties) using the Karhunen-Loeve expansion, thereby introducing the stochastic parameters, including spatial mean, spatial variance, and correlation length for example into the models. Stress and strain values for both the force-driven and displacement driven finite element analyzes are input into an objective function, whereupon the finite element simulations are updated after each iteration of the optimization process is performed until the objective function is minimized to a desired level. This results in the identification of optimized stochastic parameters associated with the heterogeneous material under investigation.

22 Claims, 1 Drawing Sheet

(56) References Cited

OTHER PUBLICATIONS

Gun Jin Yun, Shen Shang "A self-optimizing inverse analysis method for estimation of cyclic elasto-plasticity model parameters", International Journal of Plasticity 27, 2011 pp. 576-595.*
Dheeraj Chahal et al. "Automated, Parallel Optimization Algorithms for Stochastic Functions", 2011 IEEE International Parallel & Distributed Processing Symposium (Year: 2011).*
Dan Guo et al "Heterogeneous Ensemble-Based Infill Criterion for Evolutionary Multiobjective Optimization of Expensive Problems" IEEE Transactions on Cybernetics. (Year: 2013).*

* cited by examiner

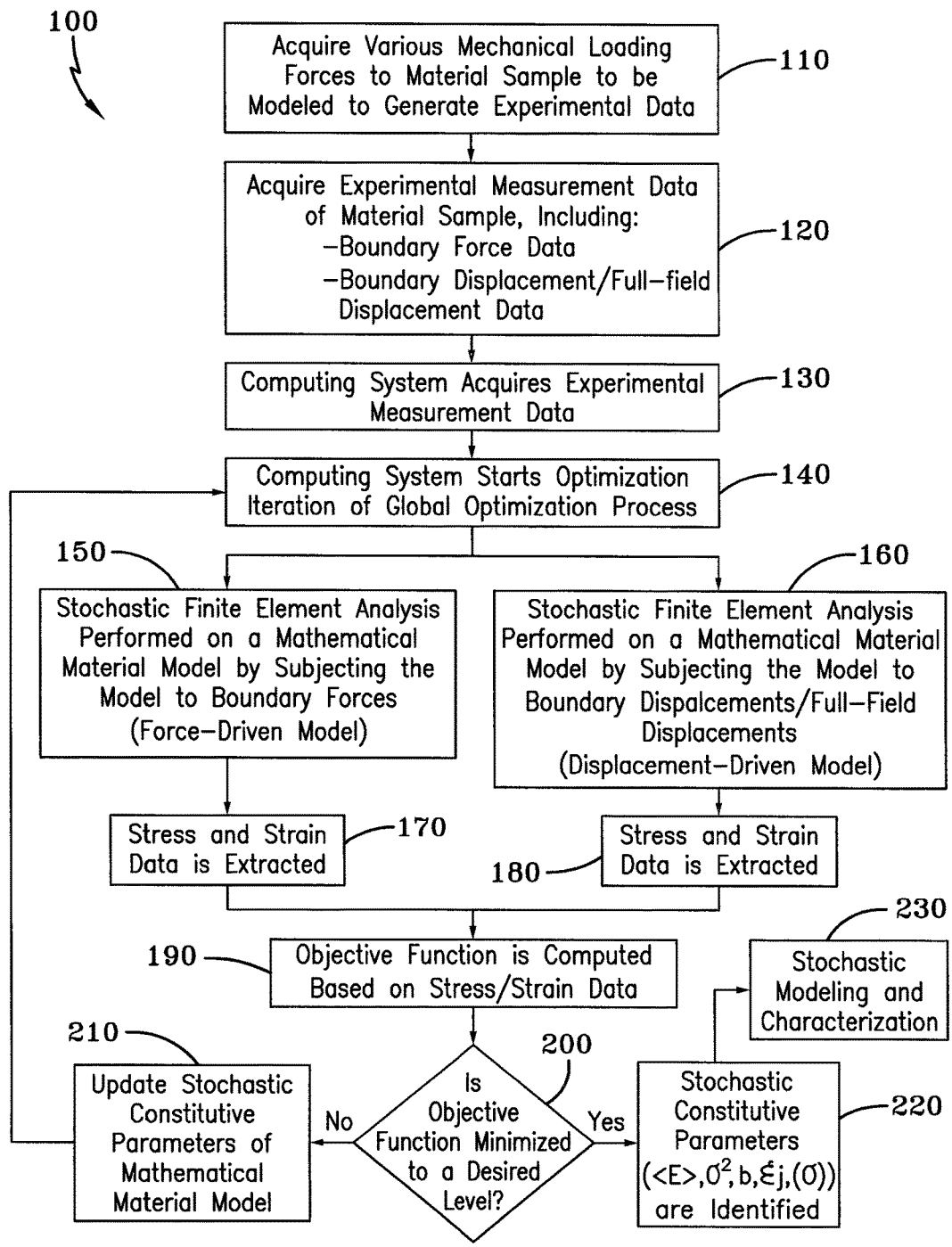

METHOD FOR IDENTIFYING STOCHASTIC INFORMATION OF HETEROGENEOUS MATERIALS

CROSS-REFERENCE TO RELATED APPLICATION

This application claims the benefit of U.S. Provisional Application No. 61/869,907 filed on Aug. 26, 2013, the content of which is incorporated herein by reference.

TECHNICAL FIELD

Generally, the present invention relates to methods of identifying various properties of materials. In particular, the present invention relates to a method for systematically identifying critical stochastic information of uncertain material characteristics. More particularly, the present invention relates to a method for systematically identifying critical stochastic information of uncertain heterogeneous material characteristics using a self-optimizing inverse computation technique (Self-OPTIM).

BACKGROUND OF THE INVENTION

Natural materials, as well as many engineered materials, are heterogeneous, whereby the physical properties of such materials spatially vary, and occur with randomness. For example, polymer matrices, metal matrix composites, cementitious materials, and natural materials (e.g. wood, geo-materials, and bones) exhibit heterogeneity at various scales. In other words, spatial variation of material properties is inherent to heterogeneous materials, and in some cases may be the result of physical damage when such materials are subjected to various loadings and forces. However, reliable structural design utilizing heterogeneous materials requires the rigorous consideration of various spatial randomness parameters (i.e. stochastic parameters) that characterize the spatial variation of properties of such materials. For example, such stochastic parameters may include spatial mean, spatial variance and correlation length.

To meet this growing need to characterize the stochastic parameters of heterogeneous materials, there has been a growing need for statistical characterization tools. Unfortunately, adequate tools for identifying key stochastic parameters of materials are unavailable, and as a result, engineers and researchers have been forced to make generalized assumptions regarding the qualitative and quantitative information of such stochastic parameters during virtual model simulations that utilize heterogeneous materials. However, probabilistic simulation results using such assumptions of the random properties of heterogeneous materials lack accuracy and reliability that is required to achieve acceptable results.

Alternatively, the characterization of the uncertainties or randomness of heterogeneous materials could be obtained from direct measurement of the material in the field. However, the ability to obtain direct measurements of the spatially correlated random properties of materials is very limited, even at the micro-scale, due to the required use of expensive measurement techniques, the lack of well-defined procedures, and the difficulties encountered in handling the large amount of data that is generated.

Therefore, there is a need for an indirect method of identifying stochastic parameters of heterogeneous materials, which include, but is not limited to the statistical parameters of: spatial mean, spatial variance, and correlation length of the spatially varying properties of heterogeneous materials. In addition, there is a need for a method of identifying stochastic parameters of a heterogeneous material that is used to reconstruct spatial distributions of random properties of a material with reference to experimental material test data. Additionally, there is a need for a method of reconstructing the spatial distribution of a specific random field in which one realization of the random filed that holds stochastic characteristics is identified, thus allowing diagnosis of material states under services and operations. Furthermore, there is a need for a systematic method of identifying probabilistic information of stochastic parameters of heterogeneous materials, which can be used to generate a statistically equivalent sample material model for use in developing probabilistic models or conducting reliability-based design of structures using such heterogeneous materials. In addition, there is a need for a method of identifying the stochastic parameters of a material using a self-optimizing inverse computation technique (Self-OPTIM).

SUMMARY OF THE INVENTION

In light of the foregoing, it is a first aspect of the present invention to provide a method for determining statistical parameters, including but not limited to spatial mean, spatial variance and spatial correlation length, and the like of multiple random fields and reconstructing spatial distributions of one realization of the random fields with reference to experimental material test data.

It is another aspect of the present invention to provide a method for identifying one or more stochastic parameters of a heterogeneous material comprising the steps of obtaining force measurement data and displacement data of the heterogeneous material; executing an optimization process on a computer, whereby the boundary force measurement data is used as boundary conditions by a first finite element simulation and the displacement data are used as boundary conditions by a second finite element simulation; executing the first simulation on a model of the material at the computer, the model having at least one stochastic parameter, whereby the first simulation subjects the model to a boundary force to identify a first set of stress and strain values; executing the second simulation on the model of the material at the computer, whereby the second simulation subjects the second material model to a boundary displacement to identify a second set of stress and strain values; inputting the first and second sets of stresses and strain values into an objective function executed at the computer; determining whether the objective function has been minimized to a desired level; and updating the at least one stochastic parameter of the first and second model and repeating the first and second simulations until the objective function is minimized to a predetermined value, so as to optimize the at least one stochastic parameter associated with the material.

BRIEF DESCRIPTION OF THE DRAWINGS

These and other features and advantages of the present invention will become better understood with regard to the following description, appended claims, and accompanying drawings, wherein:

FIG. 1 is a flow diagram showing the operational steps taken by a method for identifying stochastic information and for reconstructing random fields of heterogeneous materials

DETAILED DESCRIPTION OF THE INVENTION

A method of identifying stochastic parameters of a heterogeneous material using a self-optimizing inverse computation (Self-OPTIM) technique is referred to by numeral 100, as shown in FIG. 1 of the drawings. It should be appreciated that the stochastic parameters of heterogeneous materials identified by the process 100 may include, but are not limited to: spatial mean, spatial variance, and spatial correlation length of spatially varying properties of the heterogeneous material. Furthermore, an ensemble of multiple reconstructions of the spatial distributions for multivariate random fields may also be obtained by multiple stochastic Self-OPTIM analyses provided by the present invention with reference to multiple experimental test results of the same kind of materials. Moreover, the ensemble of reconstructed distributions can also provide correlation information between the multivariate random fields.

Initially, at step 110 of the process 100, a physical sample of a heterogeneous material (i.e. material sample) whose random or stochastic material properties is desired to be identified is evaluated when subjected to various mechanical forces and loadings, including but not limited to: tension, compression, shear, bending, and biaxial/triaxial etc. As the mechanical loading/forces are applied at step 110, boundary force measurements are completed at step 120, whereby boundary force data, and boundary displacement/full-field displacement data on the surface of the heterogeneous material are measured. For example, digital image correlation (DIC) techniques may be used to measure and obtain full-field displacement data on the surface of the sample material.

Continuing to step 130, a computing system acquires the experimental measurement data identified at step 120. It should be appreciated that the computing system utilized may comprise any suitable computer, such as a portable or desktop computing device. In one aspect, the computing system may include a suitable input and output device, such as a respective keyboard/mouse and display monitor. For example, the computing system may acquire the experimental data at step 120 by any suitable means, including manual input via the input device or may be directly interfaced with the measurement equipment used to carry out step 120.

Next, at step 140, a desired optimization algorithm or process is invoked at the computing device, whereby the optimization algorithm uses the experimental measurement data from step 130 as boundary conditions. In particular, the boundary conditions derived from the experimental measurement data is utilized in the finite element analyses discussed below. It should be appreciated that any suitable global optimization algorithm may be utilized at step 140, such as a genetic algorithm, simplex algorithm, firefly algorithm, particle swarm optimization algorithm or the like. Once the optimization process is initiated at step 140, two finite element analyses are performed in parallel at steps 150 and 160, each utilizing a mathematical constitutive model of the heterogeneous material being analyzed. It should be appreciated that the finite element analyses carried out at step 150 and 160 may be both linear and non-linear. In addition, it should be appreciated that there is no limitation as to the particular mathematical constitutive model used by the present invention to model the heterogeneous material. For example, the mathematical constitutive model used by the present invention may comprise a linear elastic model or any existing non-linear, inelastic, viscoelastic, viscoplastic or viscoelasticplastic material model. Furthermore, the mathematical constitutive model is configured, such that the spatially varying random physical material properties of the heterogeneous material being considered are modeled in the constitutive models by the Karhunen-Loeve expansion, although other suitable methods for defining the spatially varying random material properties may be used. The random field modeling employed by the Karhunen-Loeve expansion naturally introduces spatial mean ($<E>$), spatial variance ($\sigma^2$), spatial correlation length (b) and a finite number of normal random variables ($\xi_j(\theta)$, j=1, 2, ..., M) into each of the constitutive models analyzed at steps 150 and 160. Specifically, at step 150, a stochastic finite element analysis is performed by subjecting the finite element model of the heterogeneous material to boundary forces, while at step 160 a stochastic finite element analysis is performed by subjecting the finite element model of the heterogeneous material to boundary displacements/full-field displacements. That is, the stochastic finite element model is subjected to different kinds of boundary conditions from the same experimental tests, as determined at step 120. Each of the finite element analyses is executed along their full loading path at each of the iterations of the optimization process, such that one of the stochastic finite element models is subjected to boundary forces at step 150 and the other stochastic finite element model is subjected to boundary displacements/full-field displacements at step 160.

As the stochastic finite element simulations are performed in parallel at steps 150 and 160 with the constitutive material model of the heterogeneous material being analyzed, the computing system extracts stresses and strains in the selected physical domain at steps 170 and 180. Next, the computed stress and strain values generated by the finite element analyses of steps 150 and 160 are input to an objective function, denoted as "OF" that is formed at step 190, whereby $$OF = \sum_{i=1}^{n} \frac{RMSE_i^\varepsilon(\bar{\varepsilon}_F, \bar{\varepsilon}_D) + MAE_i^\varepsilon(\bar{\varepsilon}_F, \bar{\varepsilon}_D)}{R_i^{\varepsilon^2}(\bar{\varepsilon}_F, \bar{\varepsilon}_D) + 1} + \sum_{i=1}^{n} \frac{RMSE_i^\sigma(\bar{\sigma}_F, \bar{\sigma}_D) + MAE_i^\sigma(\bar{\sigma}_F, \bar{\sigma}_D)}{R_i^{\sigma^2}(\bar{\sigma}_F, \bar{\sigma}_D) + 1}$$

in the case that full-field displacements are not available. When the full-field displacements are available, the objective function (OF) can be modified by including the statistical measures between the displacements of the force-driven finite element simulation, at step 150, and the full-field displacements from the experimental measurement data, whereby $$OF = \sum_{i=1}^{n} \frac{RMSE_i^\varepsilon(\bar{\varepsilon}_F, \bar{\varepsilon}_D) + MAE_i^\varepsilon(\bar{\varepsilon}_F, \bar{\varepsilon}_D)}{R_i^{\varepsilon^2}(\bar{\varepsilon}_F, \bar{\varepsilon}_D) + 1} + \sum_{i=1}^{n} \frac{RMSE_i^\sigma(\bar{\sigma}_F, \bar{\sigma}_D) + MAE_i^\sigma(\bar{\sigma}_F, \bar{\sigma}_D)}{R_i^{\sigma^2}(\bar{\sigma}_F, \bar{\sigma}_D) + 1} +$$

$$\sum_{i=1}^{n} \frac{RMSE_i^D(D_F, D_{DIC}) + MAE_i^D(D_F, D_{DIC})}{R_i^{D^2}(D_F, D_{DIC}) + 1}$$

As such, this objective function (OF) is implemented at the computing system. As such, the objective function (OF) provides that MAE is the mean average error, R is the correlation value, RMSE is the root mean square error, $\bar{\sigma}_F$ and $\bar{\varepsilon}_F$ are respectively the stress and strain generated by the force-driven finite element model analyzed at step 150, and $\bar{\sigma}_D$ and $\bar{\varepsilon}_D$ are respectively the stress and strain generated by the displacement-driven finite element model analyzed at step 160. In addition, $D_F$ is the full-field displacement at the selected points generated by the force-driven finite element model analyzed at step 150 and $D_{DIC}$ is the full-field displacement at the same selected points from experimental measurements at step 120.

Once the objective function (OF) is computed by the computing system using the stress and strain values generated by the finite element analyses at steps 150 and 160, the computing system determines whether the objective function (OF) has been minimized to a predetermined level, as indicated at step 200. If the objective function (OF) has not been minimized to the predetermined value, then the process 100 continues to step 210. At step 210, the computing system updates the stochastic constitutive parameters of the mathematical material model used in the finite element simulations of steps 150 and 160, which include, spatial mean (<E>), spatial variance ($\sigma^2$), correlation length (b) and a finite number of normal random variables ($\xi_j(\theta)$, j=1, 2, ..., M). Once step 210 is complete, the process 100 returns to step 140 to start another iteration of the optimization process.

However, if at step 200, the objective function (OF) has been minimized to a desired level, then the process 100 continues to step 220, where the values of the stochastic constitutive parameters, are identified. Once identified, the stochastic parameters, such as spatial mean (<E>), spatial variance ($\theta^2$), correlation length (b) and a number of normal random variables ($\xi_j(\theta)$, j=1, 2, ..., M) can be used in subsequent modeling and characterization of the heterogeneous material, as indicated at step 230. Based upon the stochastic parameters identified by the present invention, further realizations (i.e. samples of heterogeneous materials) can be generated for Monte Carlo-based modeling of material, component and structural responses to perform reliability analyses of engineering designs of materials.

It should be appreciated that the method steps 130-220 may be embodied in hardware, software or combination thereof, and executed by the computing system previously discussed.

Therefore, one advantage of the present invention is that a method for identifying stochastic parameters allows uncertainties in a variety of heterogeneous materials, such as aerospace materials and civil infrastructure materials, to be identified and utilized to generate statistically equivalent material samples for use in probabilistic models or for conducting reliability-based design of materials and structures. Still another advantage of the present invention is that a method of identifying stochastic parameters of a heterogeneous material can be performed indirectly using a Self-OPTIM process. Yet another advantage of the present invention is that a method of identifying stochastic parameters of a heterogeneous material can be used to systematically identify critical probabilistic information, including but not limited to: second-order statistics of random fields, covariance structure, correlation length, and correlation between multiple random fields.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for generating an optimized model of a heterogeneous material, the method comprising:
   obtaining force measurement data and displacement data of the heterogeneous material;
   executing a first simulation on an initial model of the material in which said force measurement data defines boundary conditions of said first simulation, said initial model having at least one stochastic parameter, such that said first simulation subjects said initial model to a boundary force to identify a first set of stress and strain values;
   executing a second simulation on said initial model of the material in which said displacement data defines boundary conditions of said second simulation, such that said second simulation subjects said second initial model to a boundary displacement to identify a second set of stress and strain values;
   executing an objective function with the first and second sets of stress and strain values;
   minimizing said objective function to a predetermined level by updating said at least one stochastic parameter;
   identifying a value of said at least one stochastic parameter of said initial model associated with said minimized objective function;
   generating an optimized model of the heterogeneous material based on the value of said at least one stochastic parameter that is identified, wherein said objective function $$(OF) = \sum_{i=1}^{n} \frac{RMSE_i^{\varepsilon}(\bar{\varepsilon}_F, \bar{\varepsilon}_D) + MAE_i^{\varepsilon}(\bar{\varepsilon}_F, \bar{\varepsilon}_D)}{R_i^{\varepsilon^2}(\bar{\varepsilon}_F, \bar{\varepsilon}_D) + 1} +$$

$$\sum_{i=1}^{n} \frac{RMSE_i^{\sigma}(\bar{\sigma}_F, \bar{\sigma}_D) + MAE_i^{\sigma}(\bar{\sigma}_F, \bar{\sigma}_D)}{R_i^{\sigma^2}(\bar{\sigma}_F, \bar{\sigma}_D) + 1} +$$

$$\sum_{i=1}^{n} \frac{RMSE_i^D(D_F, D_{DIC}) + MAE_i^D(D_F, D_{DIC})}{R_i^{D^2}(D_F, D_{DIC}) + 1},$$

and wherein MAE is a mean average error, R is a correlation value, RMSE is a root mean square error, $\bar{\sigma}_F$ and $\bar{\varepsilon}_F$ are respectively said stress and strain values that are generated by said first simulation, and $\bar{\sigma}_D$ and $\bar{\varepsilon}_D$ are respectively said stress and strain values that are generated by said second simulation, $D_F$ is a full-field displacement at one or more selected points generated by said first simulation, and $D_{DIC}$ is a full-field displacement at the selected points acquired from said data of said obtaining step; and
   forming a physical structure based on said optimized model.

2. The method of claim 1, wherein said optimization process comprises an algorithm that is selected from the group consisting of a genetic algorithm, a simplex algorithm, a firefly algorithm, and a particle swarm algorithm.

3. The method of claim 1, wherein said model comprises a non-linear or linear finite element model.

4. The method of claim 1, wherein said model models said at least one stochastic parameter based on a Karhunen-Loeve expansion.

5. The method of claim 4, wherein said at least one stochastic parameter is spatial mean, spatial variance, spatial correlation length, or a normal random variable.

6. The method of claim 1, wherein said first and second simulations are performed in parallel.

7. The method of claim 1, wherein said at least one stochastic parameter comprises a spatial mean parameter.

8. The method of claim 1, wherein said at least one stochastic parameter comprises a spatial variance parameter.

9. The method of claim 1, wherein said at least one stochastic parameter comprises a correlation length parameter.

10. The method of claim 1, wherein said at least one stochastic parameter comprises one or more random variables.

11. A method for generating an optimized model of a heterogeneous material, the method comprising:
    obtaining force measurement data and displacement data of the heterogeneous material;
    executing a first simulation on an initial model of the material in which said force measurement data defines boundary conditions of said first simulation, said initial model having at least one stochastic parameter, such that said first simulation subjects said initial model to a boundary force to identify a first set of stress and strain values;
    executing a second simulation on said initial model of the material in which said displacement data defines boundary conditions of said second simulation, such that said second simulation subjects said second initial model to a boundary displacement to identify a second set of stress and strain values;
    executing an objective function with the first and second sets of stress and strain values;
    minimizing said objective function to a predetermined level by updating said at least one stochastic parameter;
    identifying a value of said at least one stochastic parameter of said initial model associated with said minimized objective function;
    generating an optimized model of the heterogeneous material based on the value of said at least one stochastic parameter that is identified, wherein said objective function $$(OF) = \sum_{i=1}^{n} \frac{RMSE_i^\varepsilon(\bar{\varepsilon}_F, \bar{\varepsilon}_D) + MAE_i^\varepsilon(\bar{\varepsilon}_F, \bar{\varepsilon}_D)}{R_i^{\varepsilon 2}(\bar{\varepsilon}_F, \bar{\varepsilon}_D) + 1} +$$

$$\sum_{i=1}^{n} \frac{RMSE_i^\sigma(\bar{\sigma}_F, \bar{\sigma}_D) + MAE_i^\sigma(\bar{\sigma}_F, \bar{\sigma}_D)}{R_i^{\sigma 2}(\bar{\sigma}_F, \bar{\sigma}_D) + 1},$$

and wherein MAE is a mean average error, R is a correlation value, RMSE is a root mean square error, $\bar{\sigma}_F$ and $\bar{\varepsilon}_F$ are respectively said stress and strain values that are generated by said first simulation, $\bar{\sigma}_D$ and $\bar{\varepsilon}_D$ and are respectively said stress and strain values that are generated by said second simulation, and
    forming a physical structure based on said optimized model.

12. The method of claim 1, wherein said minimizing step and said updating step are repeated.

13. The method of claim 11, wherein said optimization process comprises an algorithm that is selected from the group consisting of a genetic algorithm, a simplex algorithm, a firefly algorithm, and a particle swarm algorithm.

14. The method of claim 11, wherein said model comprises a non-linear or linear finite element model.

15. The method of claim 11, wherein said model models said at least one stochastic parameter based on a Karhunen-Loeve expansion.

16. The method of claim 15, wherein said at least one stochastic parameter is spatial mean, spatial variance, spatial correlation length, or a normal random variable.

17. The method of claim 11, wherein said first and second simulations are performed in parallel.

18. The method of claim 11, wherein said at least one stochastic parameter comprises a spatial mean parameter.

19. The method of claim 11, wherein said at least one stochastic parameter comprises a spatial variance parameter.

20. The method of claim 11, wherein said at least one stochastic parameter comprises a correlation length parameter.

21. The method of claim 11, wherein said at least one stochastic parameter comprises one or more random variables.

22. The method of claim 11, wherein said minimizing step and said updating step are repeated.

* * * * *